J. RITTER, JR

WARDROBE CASE

June 14, 1932.

Re. 18,499

Original Filed July 25, 1927 2 Sheets-Sheet 1

INVENTOR.

Julius Ritter Jr.,

BY Morsell, Keeney & Morsell

ATTORNEYS

J. RITTER, JR

WARDROBE CASE

June 14, 1932. Re. 18,499

Original Filed July 25, 1927 2 Sheets-Sheet 2

INVENTOR.

Julius Ritter Jr.,

BY Morsell, Keeney & Morsell

ATTORNEYS

Reissued June 14, 1932

Re. 18,499

UNITED STATES PATENT OFFICE

JULIUS RITTER, JR., OF RACINE, WISCONSIN, ASSIGNOR TO HARTMANN TRUNK COMPANY, OF RACINE, WISCONSIN, A CORPORATION OF WISCONSIN

WARDROBE CASE

Original No. 1,719,625, dated July 2, 1929, Serial No. 208,293, filed July 25, 1927. Application for reissue filed December 7, 1929. Serial No. 412,558.

This invention relates to improvements in wardrobe cases, particularly adapted for use as hand luggage.

In the ordinary form of hand luggage, many of the garments, such as suits, coats, dresses and the like, are folded and packed into the bag with the result that when removed the garments are badly creased and require pressing before use. Furthermore, the ordinary piece of hand luggage is not of sufficient length to permit garments to be suspended upon hangers and the hangers supported on fixtures within the case without folding and packing the garments in a manner so that bad creasing will result.

It is one of the objects of the present invention to overcome the before-mentioned objectionable features and provide a wardrobe case which is of comparatively small size and in which provision is made for supporting garments without the necessity of folding portions of the garments tightly together.

A further object of the invention is to provide a wardrobe case having two sections and several compartments and means for maintaining the compartments in both sections of the case separately from each other.

A further object of the invention is to provide a wardrobe case having a tray forming a partition in which a portion thereof serves as a means around which the garments are folded without creasing or wrinkling.

A further object of the invention is to provide a wardrobe case formed of two hinged together sections having means for holding the parts in open position.

A further object of the invention is to provide a wardrobe case in which the two sections are hingedly connected in a manner so as to provide an end space or well for the accommodation of portions of garments when the sections are closed, preventing the garments from being pinched or creased by the closing of said sections.

A further object of the invention is to provide a wardrobe case which, when closed, is of rectangular form and is easily handled and has a large capacity for holding garments in position to prevent wrinkling or creasing.

A further object of the invention is to provide a wardrobe case which is of such size and dimensions as to readily fit under an ordinary Pullman berth.

A further object of the invention is to provide a wardrobe case which is of very simple construction, is neat and attractive in appearance, is strong and durable, and is well adapted for the purposes described.

With the above and other objects in view the invention consists of the improved wardrobe case, and its parts and combinations, as set forth in the claims, and all equivalents thereof.

In the accompanying drawings in which the same reference characters indicate the same parts in all of the views.

Referring now more particularly to the drawings it will appear that the numeral 8 indicates the wardrobe or cover section and 9 indicates the tray or main section. The tray section 9 is L-shaped with an end extension portion 9′ and said extension portion has a relatively narrow end wall 10 to the inner edge portion of which the wardrobe section is connected by means of hinges 11, providing a construction whereby the connection between the two sections is off-set from the bottom portion or rear of the case. Each section of the case is U-shaped in cross-section and the extension portion 9′ is of a height corresponding approximately to the cross-sectional depth of the wardrobe section so that when in closed position the two sections will form a rectangular casing.

Figure 4:
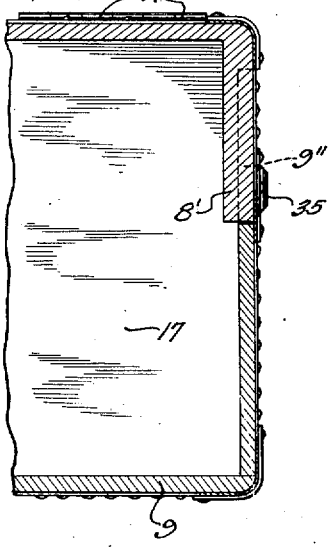
Fig. 4 is an enlarged detail sectional view through a corner of the case with the parts in closed position, showing details of the corner and wall construction.
Figure 1:
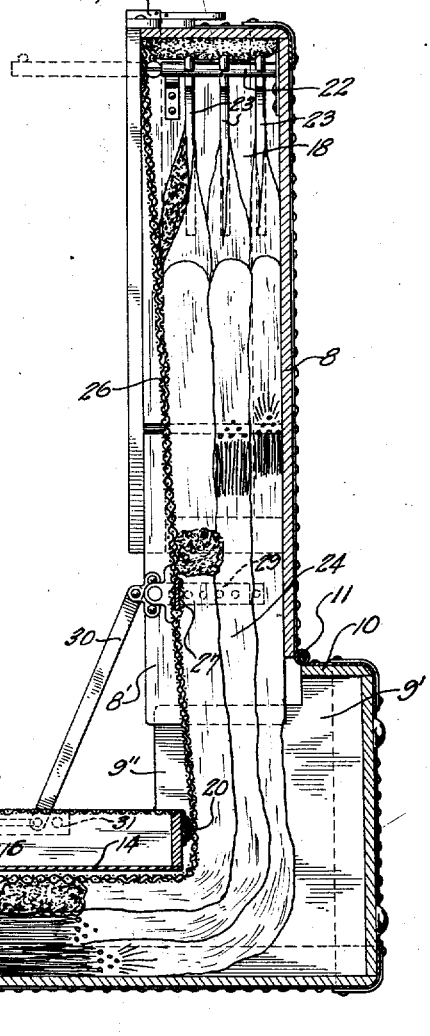
Fig. 1 is a vertical sectional view of the improved wardrobe case shown in open position.
Figure 5:
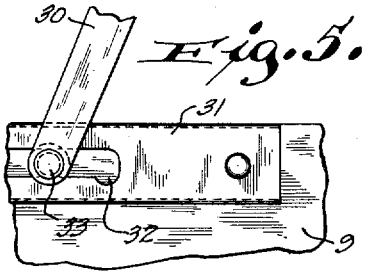
Fig. 5 is an enlarged fragmentary detail view of the means for holding the case sections in open position.
Figures 2, 3:
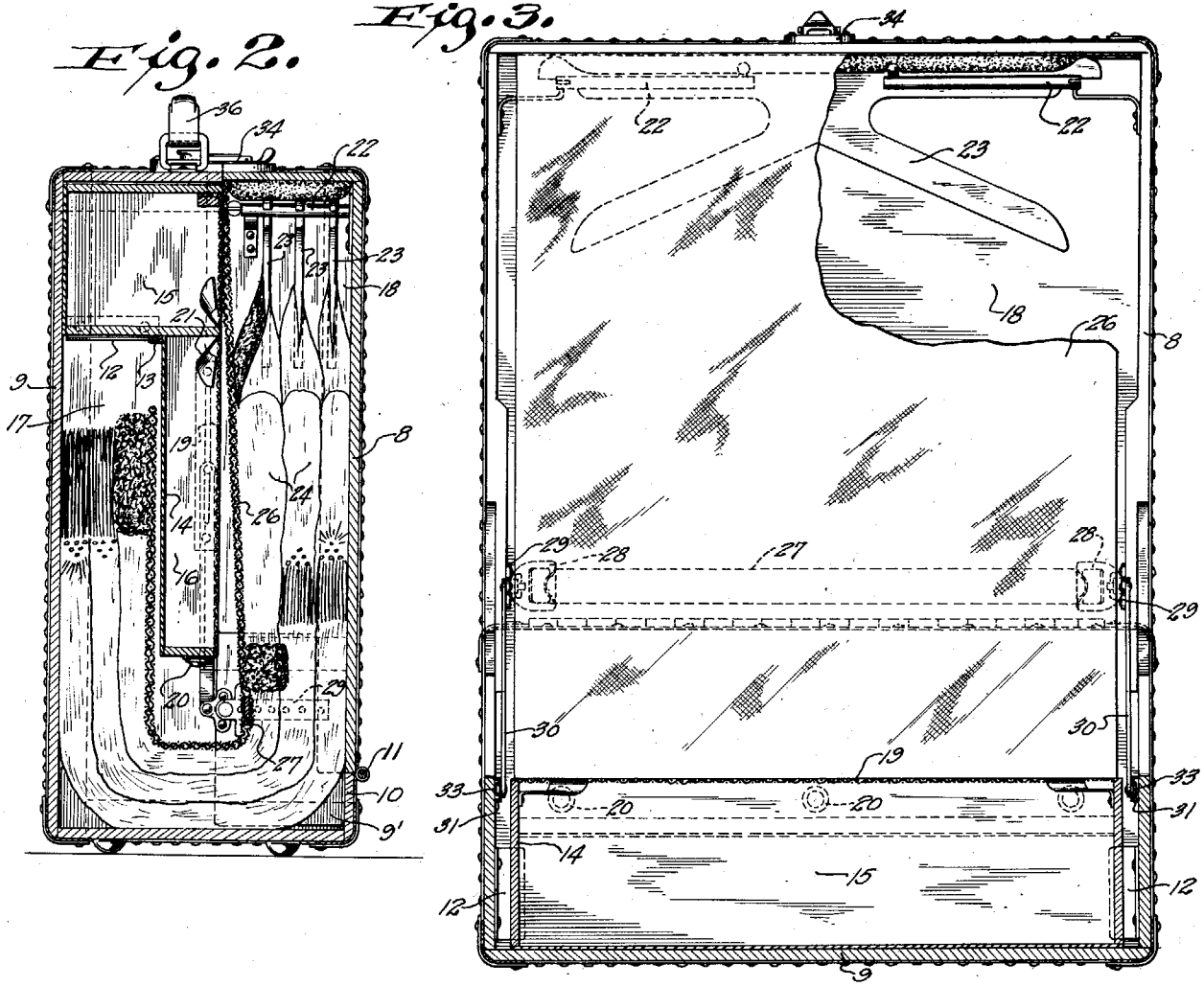
Fig. 2 is a similar view but with the parts shown in closed position.
Fig. 3 is a front view of the case in the position shown in Fig. 1 with one part thereof in vertical section.

The tray section 9 at its inner opposite sides is provided with inwardly projecting brackets 12 which engage a transverse rib 13 on the under surface of a tray 14 and serve to maintain said tray in position within said section. The tray is formed with a deep forward compartment 15 and a shallow rear compartment 16 which extends inwardly adjacent the upper edge portion of the tray section and over the angle brackets 12, as shown in Fig. 1. The bottom portion of the deep compartment 15 rests upon the bottom or side portion of the tray section, while the bottom portion of the shallow compartment 16 is spaced therefrom to form an extension compartment or well 17 to the wardrobe compartment 18 of the other section 8. The vertical walls of the tray define the compartment 17, forming partitions to separate the compartment 17 from the other portion of the section 9. It will also be noted, that because of the extension portion 9′, the compartment 17 is L-shaped and the extension portion of said compartment is of greater depth than the compartment 18 of the section 8, due to the offset mounting of said section with respect to the extension 9′. This additional depth to the compartment 17 is not normally occupied by portions of garments, when the case is open, as in Fig. 1. However, when the sections are closed, the space normally occupied by the garments is reduced, and by the provision of the additional off-set end portion to the compartment 17, portions of the garments assume a position therein and are amply accommodated without wrinkling or crimping, as shown in Fig. 2. It is also apparent that the wardrobe section compartment 18 combined with the compartment 17 provides a space sufficient for the longest garments in normal use. A cover or curtain 19 connected to the outer portion of the tray is arranged to extend over the upper open part of said tray and is removably attached to the inner portion thereof by snap buttons 20, and said curtain serves to hold articles within the tray. Strap handles 21 are connected to the inner sides of the tray for convenience in removing the same from the section.

The upper, inner, opposite side portions of the wardrobe section are provided with parallel foldable garment hanger tracks 22 and garment hangers 23 are slidably mounted on the tracks and are arranged to hold wearing apparel 24 which may be of a length to extend into the extension compartment 17 without wrinkling. As the long apparel folds around the inner end of the tray and is not tightly packed it will not wrinkle.

The upper straight edges or rod portions of the garment hangers 23, when the hangers are pulled out of the cover section 8 and on the extensions of the tracks 22 mounted in the upper portion of the cover section 8, permit garments to be folded over said rod portions and extend into the well 17 below the cover when said cover is in open position as shown in Fig. 1.

The upper portion of the wardrobe section is provided with a cushion into which the hangers or the apparel draped thereover imbed to hold the apparel thereon and the hangers in position. A curtain 26, connected to the upper portion of the wardrobe section, extends downwardly therefrom in front of the apparel supported from the garment hangers and into the extension compartment 17 to protect said apparel. The curtain is provided with a flexible garment retainer 27 having metal locking end members 28 which engage perforated side brackets 29 to hold the curtain and apparel in position within the cover compartment. Brace arms 30 pivotally connected to the inner opposite sides of the wardrobe section 8 extend downwardly therefrom and have slidable and pivotal connections with slotted guide bars 31 to prevent the wardrobe section from being swung above a vertical position. The said bars are formed with recesses 32 into which pins 33 forming part of the arms 30 extend to hold the wardrobe section in open upright position, as shown in Fig. 1.

In folding the case it is only necessary to raise the brace arms slightly to disengage the recesses 32 and in swinging to closed position the slightly inwardly off-set side portions 8′ of the wardrobe section are overlapped by the side portions 9″ of the extension portion 9′.

The case is secured in closed position by a lock 34 and catches 35 and a handle 36 is provided for convenience in carrying the case.

From the foregoing description it will be seen that the wardrobe case, although very compact and small, will hold full length garments without creasing or wrinkling, and in the provision of the extra zone or length to the compartment 17 there is ample space for portions of garments when the case sections are folded. It will be further seen that the wardrobe case is of very simple construction, and is well adapted for the purposes described.

What I claim as my invention is:

1. A wardrobe case, comprising a main section having an upwardly extending side extension, a portion of said extension having a right angular opening, a cover section of less depth than said side extension and having an open lower end portion which is hinged to said extension adjacent its opening and inwardly of the end of the extension and forming a continuation thereof, and garment hangers mounted in the upper portion of the cover section for holding garments which may extend into the main section without creasing.

2. A wardrobe case, comprising a rectangular main section having an open side extension, a tray mounted in the section and having an inwardly projecting extension which forms an extension compartment between the tray and the main section, a rectangular cover section having an open lower portion which is hinged to the open portion of the extension inwardly of its end and forms, when open, a reduced continuation thereof, garment hangers mounted in the upper portion of the cover section for holding garments which may extend around the extension of the tray and into the extension compartment, and means for holding the cover in open position.

3. A wardrobe case, comprising a main section having an integral upwardly extending side extension formed with a right angular opening, the projecting end portion of said extension having an end wall of less width than the depth of said extension, a cover section hingedly connected to the inner edge portion of said extension end wall, the cover section being of less depth than the depth of the extension, and garment hangers mounted in the upper portion of the cover section for holding garments which may extend into the extension and main section.

4. In a hand carrying case, the combination of a box-like body, a cover hinged thereto, a partition in the body forming a well in the body beneath the raised cover and at a right angle to the cover when the case is closed, a transversely extending clothes supporting rod extendably mounted in the free end of the cover whereby the rod when moved away from the cover may have full length dresses folded thereover with their depending ends extending down into the well and whereby the rod and the clothes thereon may be moved closer towards the cover, and means for holding the clothes opposite the cover towards said cover.

5. In a hand carrying case, the combination of a box-like case having a body portion higher at one side than at its opposite side and provided with a partition spaced from the bottom of the body portion and from the back higher side of the case to form a well on one side of the partition and a space for wearing apparel on the other side, a flanged cover hinged to the free edge of the high side of the case and having its flanges offset relative to the sides of the case to form a rectangular box, and transverse supporting means adapted to have a garment folded thereover, whereby the lower end of the garment may be received in the well, said supporting means being removably and replaceably mounted in the upper end of the cover.

6. In a hand carrying case, the combination of a box-like case having a body portion higher at one side than at its opposite side and provided with a partition spaced from the back higher side of the case and forming a well, a flanged cover hinged to the free edge of the high side of the case and having its flanges angled relative to the sides of the case to form a rectangular box, a clothes rack having end portions pivotally mounted within the upper corners of the cover and adapted to be swung therewithin or extended outwardly without the cover over the well, and a clothes rod connecting the free ends of the clothes rack.

7. In a hand carrying case, the combination of a box-like body, a cover hinged thereto, a partition in the body forming a well in the body beneath the raised cover and extending beneath the partition parallel to the cover when the case is closed, a clothes rack having portions movably mounted near the free end of the cover and having a transversely extending clothes rod supported on said rack, said rack portions being adapted to be moved so as to hold said rod farther from said cover for holding the clothes thereover with their ends extending down into said well and said rack portions being adapted to be moved back and the said rod positioned nearer the cover, and means for holding the clothes opposite the cover towards the said cover.

8. In a hand carrying case, the combination of a box-like case having a body portion provided with a well, a flanged cover hinged to one of the free edges of the body portion to form a rectangular box, and a transverse garment supporting means having an upper straight edge portion positioned in the free end of the cover and movable outwardly from the cover to a position over the well to permit a garment to be folded thereover, whereby the lower end of the garment may be received in the well and remain therein while the cover is in open or closed position.

In testimony whereof, I affix my signature.

JULIUS RITTER, Jr.